INVENTOR.
WAYNE E. DEVAUL,

BY HIS ATTORNEYS.
Spensley & Horn.

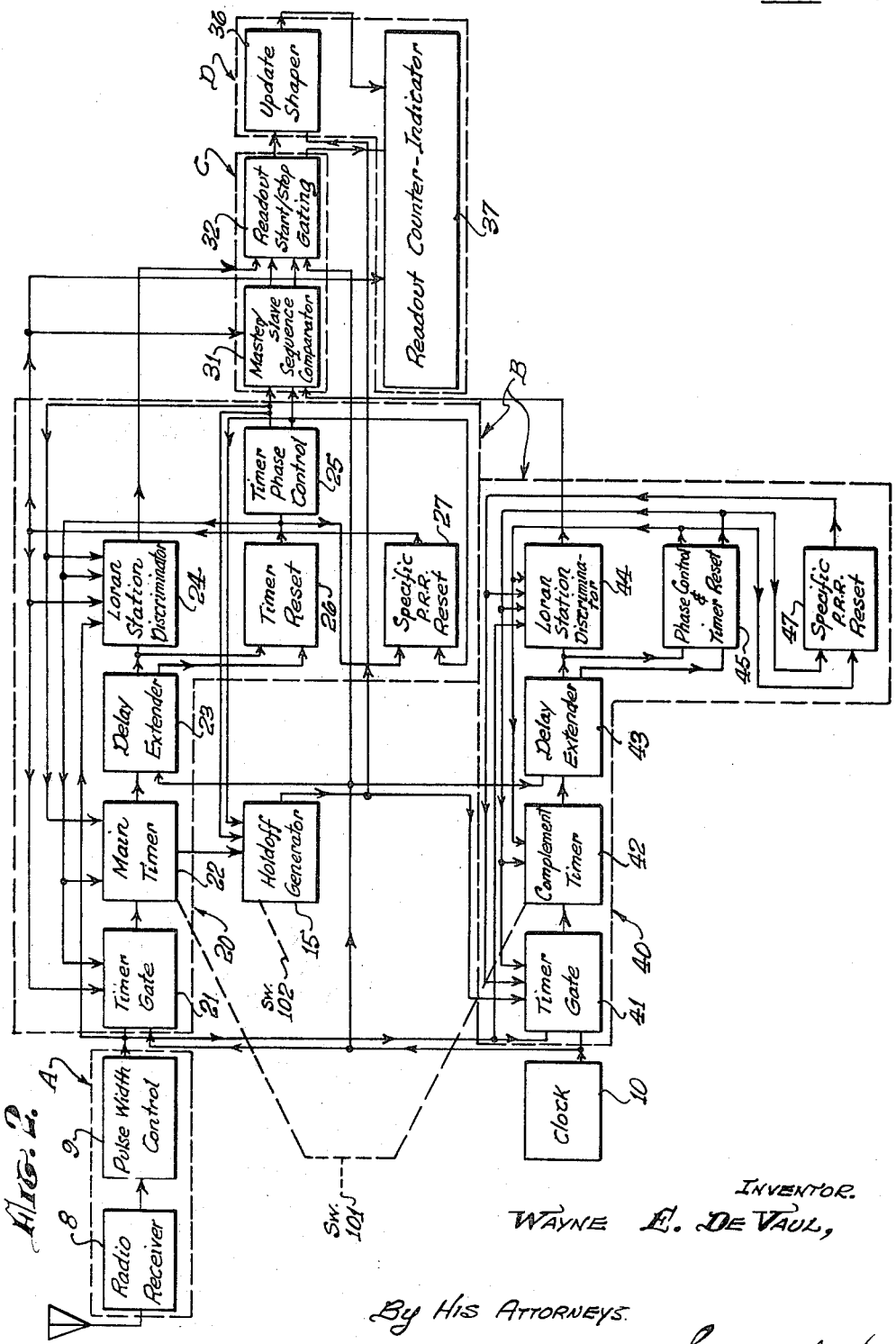

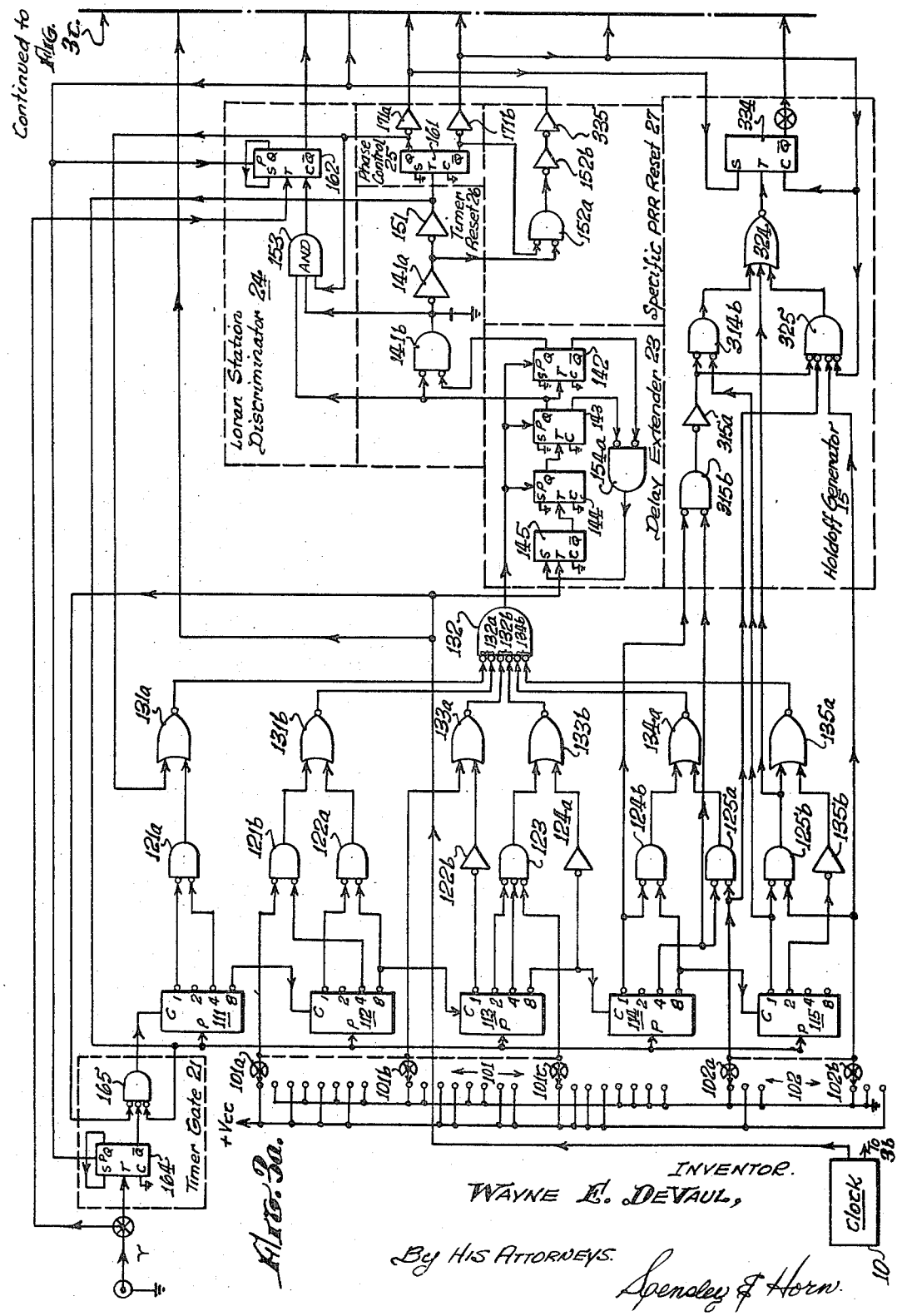

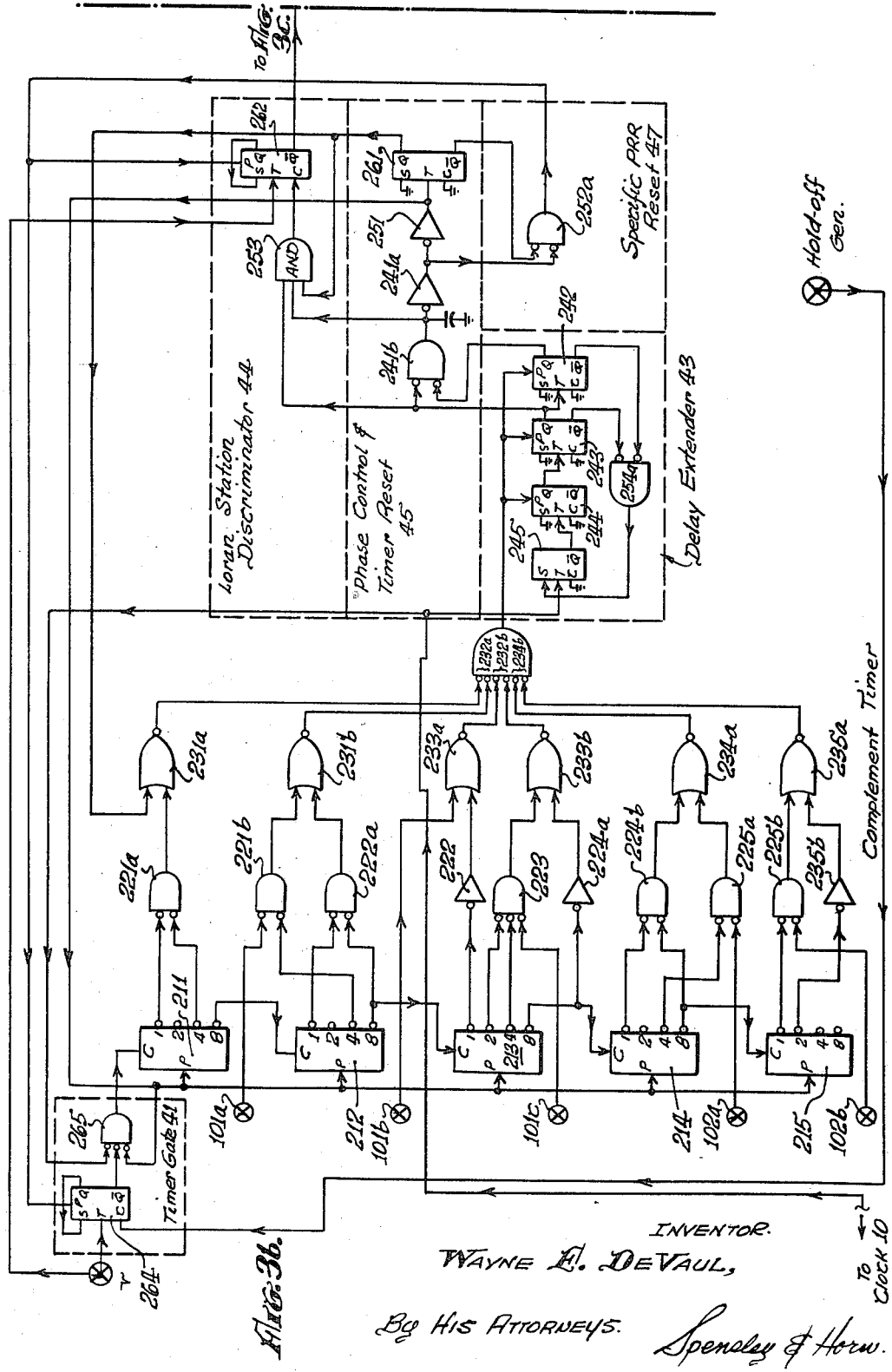

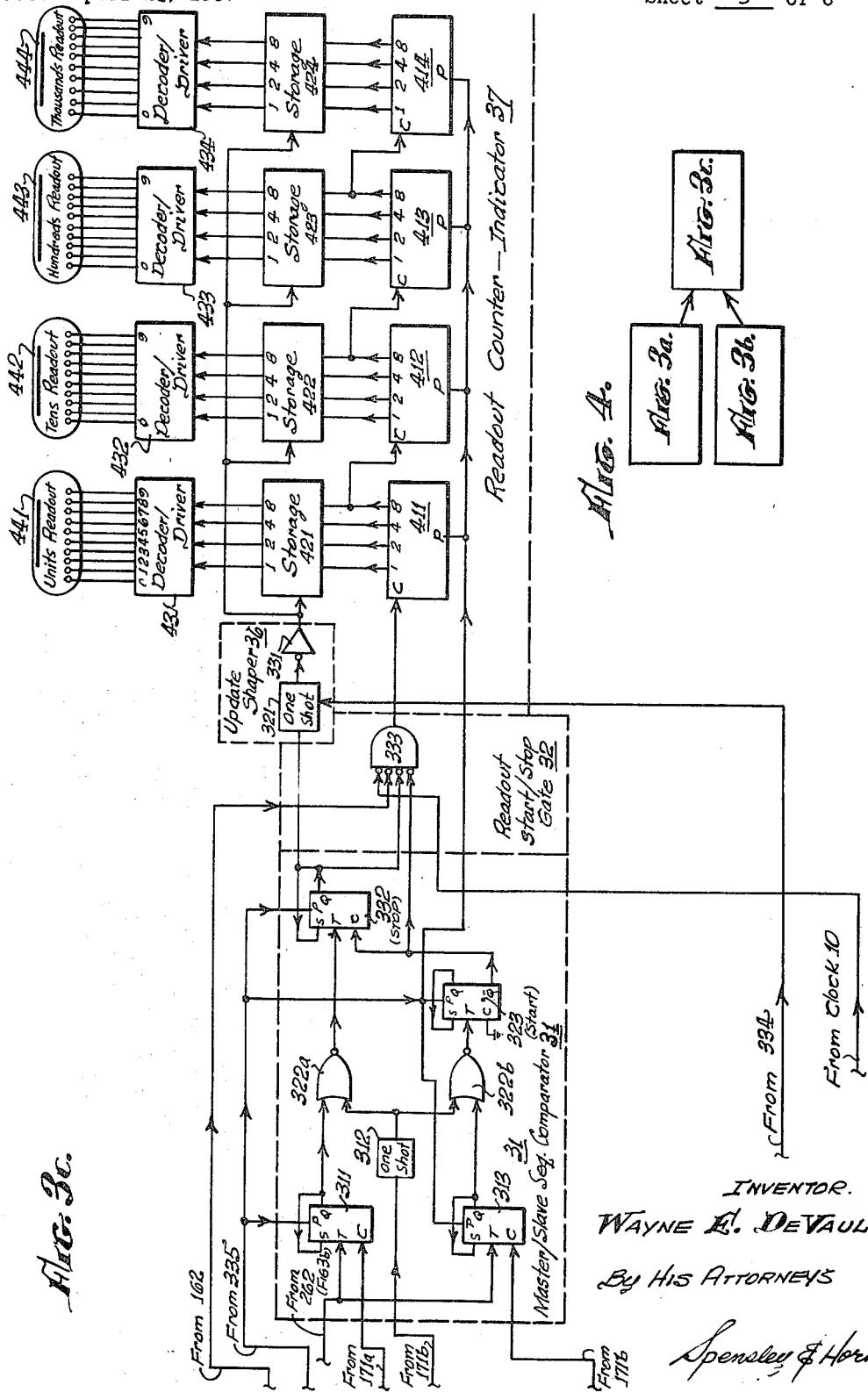

INVENTOR.
WAYNE E. DeVAUL,
By His Attorneys
Spensley & Horn

United States Patent Office 3,422,433
Patented Jan. 14, 1969

3,422,433
LORAN RECEIVING SYSTEM
Wayne E. De Vaul, Torrance, Calif., assignor to Guidance Technology Inc., Santa Monica, Calif., a corporation of California
Filed Apr. 21, 1967, Ser. No. 632,655
U.S. Cl. 343—103                                  7 Claims
Int. Cl. G01s 1/24

ABSTRACT OF THE DISCLOSURE

Receiving system for indicating the time interval between received pulses produced in a known time relationship, such as loran signals. The apparatus selects from the received pulses those recurring at the desired repetition rate, generates a marker pulse one-half the pulse period after the first selected pulse, and measures the time interval between the marker pulse and the second selected pulse, regardless of which occurs first. Marker pulses are generated one-half the pulse period after alternate ones of the subsequently selected pulses so the measurements can be continuously repeated.

BACKGROUND OF THE INVENTION

This invention pertains to receivers for phase coded pulse signals such as used in navigational systems and more particularly to an improved system for rapidly and automatically indicating the time interval between received radio pulses produced in a known time relationship, such as those transmitted by the master and slave stations in a loran type navigational system.

In certain kinds of navigational control systems, of which the well known loran system is typical, location of a craft is determined by measuring the difference in time of arrival of accurately synchronized master and slave radio pulses from pairs of transmitting stations at known spaced apart locations. Given the velocity of radio wave propagation, the difference in arrival time can be converted to a difference in distance from the two known transmitting locations. The difference in distance determines a hyperbolic line of position along which the craft must be located.

Prior art loran receivers operate basically by distinguishing between the master and slave pulses in each loran pulse group of the station pair and selecting the master pulse to begin an interval of time which ends with reception of the slave pulse, measurement of a time interval between these pulses providing the desired loran line information. This technique requires extensive circuitry to distinguish the master and slave pulses not only from noise and other extraneous pulses, but also from each other, and to selectively establish the master pulse as a reference for the beginning of the time measurement. To obtain a measurement using this prior art technique requires the reception of many loran pulse groups, typically on the order of a few hundred in the presence of noise or sky wave reception. Since a loran pulse group period is on the order of 40 milliseconds for L-band loran stations it is apparent that measurements extending hundreds of loran periods are fairly slow.

It has long been desired to utilize the loran navigational system in aircraft. However, the relatively long time necessary to obtain readings in prior art loran receivers has placed a severe limitation upon the accuracy in determining the position of such fast moving craft. Even with the recent application of computer techniques to loran receiving systems the measurement time still takes several seconds, primarily due to the basic approach which necessitates specific identification of the master pulse and initiation of the time measurement with the master pulse.

SUMMARY OF THE INVENTION

The present invention is directed toward a new and different approach to a measuring technique in which it is unnecessary to distinguish between the master and slave pulses, and hence unnecessary to initiate measurement with the master pulse, the results being that a measurement can be taken upon reception of only several loran pulse groups. The present invention approach is based upon appreciation of the fact that for a known loran pulse group period the time interval beginning with reception of a master pulse and extending to one half of the loran period after reception of the immediately preceding slave pulse is identical to the time interval beginning one half of the loran period after reception of a master pulse and ending with reception of the next succeeding slave pulse.

Accordingly, the basic operational concept of the present invention receiving system is to select from the received pulses those pulses recurring at the pulse repetition rate of the loran station pair to which the system is tuned, to generate a marker pulse one half the loran period after the first one of the selected pulses and measure the time interval between the marker pulse and the selected pulse next succeeding the first selected pulse, regardless of whether or not the marker pulse is generated before or after the said next succeeding selected pulse, and correlate the measured time interval to the loran line of position for presentation of an information output by suitable indicating means. By generating a marker pulse one half the loran period after alternate ones of the subsequently selected pulses, the measurements can be continuously repeated to thereby continually update the information output. An information output can be obtained from the present invention system upon reception of only two successive loran pulse groups, this being the minimum interval necessary to identify pulses recurring at the known loran pulse repetition rate. Such rapid system operation is enabled by the use of modern computer techniques and circuitry.

Furthermore, the selection of pulses recurring at the desired pulse repetition rate is facilitated in the present invention system by rendering the computer circuitry insentitive to received pulses for those intervals of time during which ground wave signals from the selected loran transmitting station pair could not be arriving, based upon the computations then in progress. Since sky wave reception occurs subsequent to ground wave reception and usually involves multiple signals, the errors in readout information due to sky wave reception in the presence of the ground wave and the effects of extraneous received signals are substantially reduced.

Accordingly, it is an object of the present invention to provide an improved receiving system for phase coded pulse signals.

It is also an object of the present invention to provide an improved receiving system for loran signals.

It is another object of the present invention to provide an improved system for rapidly and automatically measuring the time interval between received radio pulses produced in a known time relationship.

It is a further object of the present invention to provide an improved loran receiving system in which it is unnecessary to distinguish between master and slave pulses.

It is yet another object of the present invention to provide an improved loran receiving system in which it is unnecessary to initiate measurement with loran station master pulses.

It is also an object of the present invention to provide an improved loran receiving system capable of indicating positional information upon reception of only several sequential loran pulse groups.

It is another object of the present invention to provide an improved loran receiving system in which sky wave reception does not significantly lengthen the time necessary for completing measurements.

It is a yet further object of the present invention to provide an improved loran receiving system which is effectively rendered insensitive to sky wave reception in the presence of ground wave signals.

It is a still further object of the present invention to provide an improved loran receiving system in which the effects of extraneous received signals are substantially reduced.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention. Although the present invention was developed for use in a loran navigational system and will be described with respect thereto, it is also to be understood that the present invention concepts may be equally applicable to other types of navigational systems utilizing phase coded pulse signals.

BRIEF DESCRIPTION OF THE DRAWING

In the drawing:

FIGURE 2 is a more detailed block diagram of the system of FIGURE 1;

FIGURES 3a, 3b and 3c are schematic diagrams depicting the logic circuitry for the system of FIGURE 2;

FIGURE 4 is a block diagram indicating the interrelationship of FIGURES 3a, 3b and 3c;

DESCRIPTION OF THE PREFERRED EMBODIMENT

Figure 1:
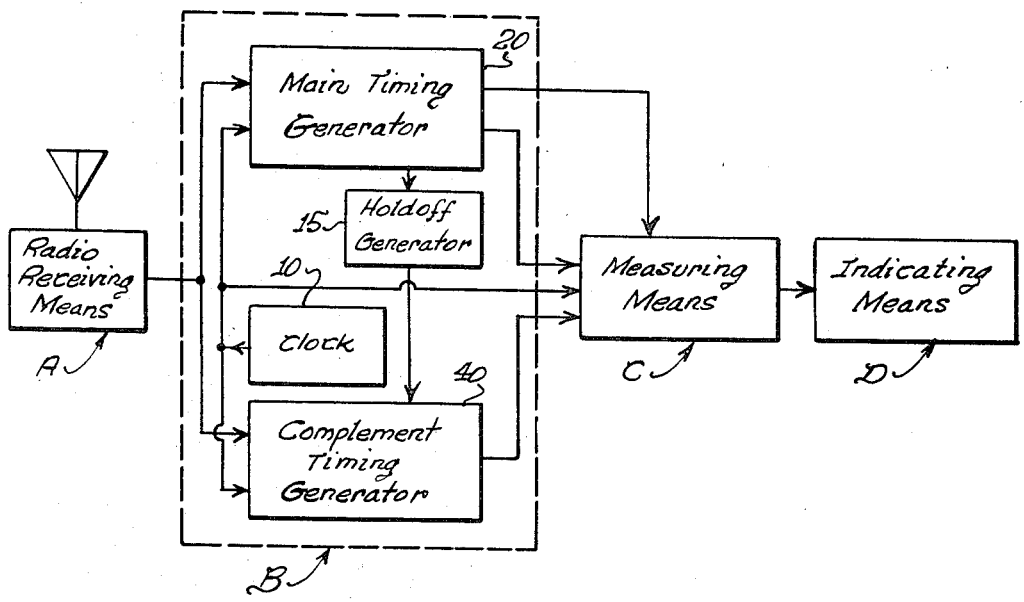
FIGURE 1 is a block diagram of the basic present invention receiving system.

With reference now to the drawings, wherein like or corresponding parts are designated by the same reference characters throughout the several views, there is shown in FIGURE 1 a block diagram depicting the presently preferred embodiment of the present invention system in its most general form. Basically, the system comprises radio receiving means A for receiving and detecting radio signals on the various loran frequencies, discriminating and computing means B (dashed line enclosure) for selecting from the detected signals those pulses recurring at the known repetition rate of the loran station pair to which the receiver is tuned and for generating a marker pulse one half the loran pulse group period after alternate ones of the selected pulses, measuring means C for measuring the time interval between each marker pulse and the selected pulse next succeeding the pulse to which that marker pulse is referenced, regardless of whether or not the marker pulse is generated before or after this next succeeding pulse, and indicating means D for correlating the measured time intervals to the loran line of position and presenting an information output indicative thereof.

The radio receiving means A is selectively tunable to the frequencies of the various loran transmitting station pairs and upon detection of a signal pulse produces an output pulse having a steep leading edge occurring at the 90° point of the cosine function of the received pulse, in accordance with the customary technique for loran signal reference synchronization. It is only the leading edge of this output which is utilized in the present invention system, thereby enabling the inclusion in the radio receiving means of novel pulse stretching circuitry to effectively render the system insensitive to sky wave reception in the presence of ground wave signals, as will be hereinafter explained.

It is presently preferred to perform the functions of the discriminating and computing means B by the circuitry shown in block form within the dashed line enclosure representing the discriminating and computing means B in FIGURE 1. The basic function of the discriminating and computing means B is to select those received pulses which occur at the pulse repetition rate of the loran station pair to which the apparatus is tuned, generate a marker pulse one half the loran period after alternate ones of the selected pulses, and feed the marker pulses and pulses indicative of the selected pulses to the measuring means C. This is accomplished in the preferred embodiment by employing two timing generators 20 and 40, these generators being sequentially actuated by the selected pulses. Each of these generators operates to create a program gate which is momentarily opened one loran period after generator actuation, so that only those subsequently applied pulses which are coincident with these program gates can pass through and cause generation of a "pulse selection verification" output to the measuring means C. In addition, the generator 20 produces a marker pulse one half the loran period after each actuation, these marker pulses also being fed to the measuring means C. Accordingly, the generator 20 is designated the main timing generator, the generator 40 being designated the complement timing generator.

The various timing intervals for establishment of the program gates and marker pulses are generated by counting circuitry in each of the generators 20 and 40, fed from a master clock 10, the clock producing a continuous train of timed output pulses at a frequency high enough to enable accurate time measurement, 1 mHz. being present preferred. The timing pulses from the clock 10 also enable the measurement of time by the measuring means C and the correlation of the measured time interval to the loran line of position in the indicating means D, as will be hereinafter explained.

Output pulses from the receiving means A are applied to both the main and complement timing generators 20 and 40. However, a holdoff generator 15 is provided to prevent both of the timing generators from being actuated by the same pulse, the holdoff generator 15 performing the additional function of rendering the complement timing generator 40 insensitive to applied pulses during a predetermined time interval after actuation of the main timing generator 20. This holdoff interval is set at the residual times of stations in the particular loran band to which the apparatus is tuned, for example, 5, 10 or 15 milliseconds respectively for the H, L and S bands, by means of a switch 102.

Furthermore, each of the timing generators 20 and 40 include circuitry which, upon actuation of the generator, will render that generator insensitive to subsequently applied pulses for an interval of time just slightly less than the loran pulse group period. In this manner the desired pulse selection is accomplished, the first applied receiver output pulse actuating the main timing generator 20 to produce a marker pulse one half the loran period later and set up a program gate one loran period after actuation. Upon completion of the holdoff interval the holdoff generator 15 enables the complement timing generator 40 so that the next subsequently applied receiver output pulse will actuate this generator to set up a program gate one loran period subsequent to actuation. If a receiver output pulse should occur one loran period after actuation of the main timing generator 20 this pulse will pass through the program gate of the main timing generator 20 and cause a pulse selection verification output to be applied to the measuring means C. In a similar manner should a receiver output pulse occur one loran period after actuation of the complement timing generator 40 that pulse will pass through the program gate of the complement timing generator 40 and cause a pulse selection verification output to be applied ot the measuring means C.

The measuring means C operates to determine the arrival sequence of a half period marker pulse from the timing generator 20 and a receiver output pulse coming through the program gate of the timing generator 40 for each loran period, and to measure the time interval between these pulses if a receiver output pulse comes through the program gate of the timing generator 20 during that loran period. The output of the measuring means C is in the form of a series of clock pulses extending for the measured time interval.

The clock pulse output of the measuring means C is fed to the indicating means D which counts the clock pulses and correlates the count to the loran line of position and presents a visual information output. The indicating means D also contains storage elements and updating circuitry for a continual readout which quickly reflects changes in positional information and enables ready identification of transient readings.

In FIGURE 2 of the drawing there is shown another block diagram of the system, in more detail than the block diagram of FIGURE 1 to facilitate explanation of the above-described functions. In FIGURE 2 the radio receiving means A is seen to basically comprise a radio receiver 8 and a pulse width control 9. The radio receiver 8 performs the basic tuning and detecting functions of an ordinary prior art loran receiver, and the radio receiver 8 can be comprised of that portion of a prior art loran receiver circuit from its antenna terminal to its zero crossover detector output. Typically, such a circuit would comprise a mixer, IF stages, second detector, differentiating amplifiers, and a polarized zero crossover detector. Each received loran pulse produces an output pulse from the zero crossover detector, the leading edge of the output pulse being the 90° point of the cosine function of the received pulse. The 90° crossover point is important because of the type and form of modulation of the transmitted loran signals in accordance with current usage, the crossover point being used in the shore stations as a timing reference. In the prior art loran receivers the zero crossover detector output was fed to a multivibrator which actuated servos, or other indicating mechanisms, to give the desired output. In the present invention, however, the zero crossover detector output from the receiver 8 is fed to the pulse width control 9.

In accordance with usual loran detection processes, if all signals received are loran ground wave pulses a cosine squared waveform will be produced as the output of the receiver 8. Since a train of pulses produced by a multiplicity of loran shore stations will ordinarily be received, the pulse amplitude will vary according to propagation laws. And it is for this reason that the 90° point of the received pulse has been used as the reference point for time measurement at all loran shore stations. Thus, all loran signals received and treated such that no amplitude or phase distortion is produced in the RF and IF circuits will, when differentiated twice, produce a waveform having a first zero reference level crossover occurring at the 90° point.

It is presently preferred to feed the waveform thus produced to the discriminating and computing means B through pulse width control 9, the details of which will be hereinbelow discussed with reference to FIGURE 7. The pulse width control 9 includes the aforementioned pulse stretching circuitry for effectively rendering the system insensitive to sky wave reception in the presence of ground wave signals, and a multivibrator which produces a 40 microsecond pulse width. The pulse stretching circuitry can be omitted from the system in some certain applications since the discriminating and computing means are triggered by the leading edge of output pulses from the receiving means A. Conversely, the pulse width control 9 may be incorporated in conventional loran receiving systems to provide a sky wave blanking function in the same manner as in the present invention system.

Figure 7:
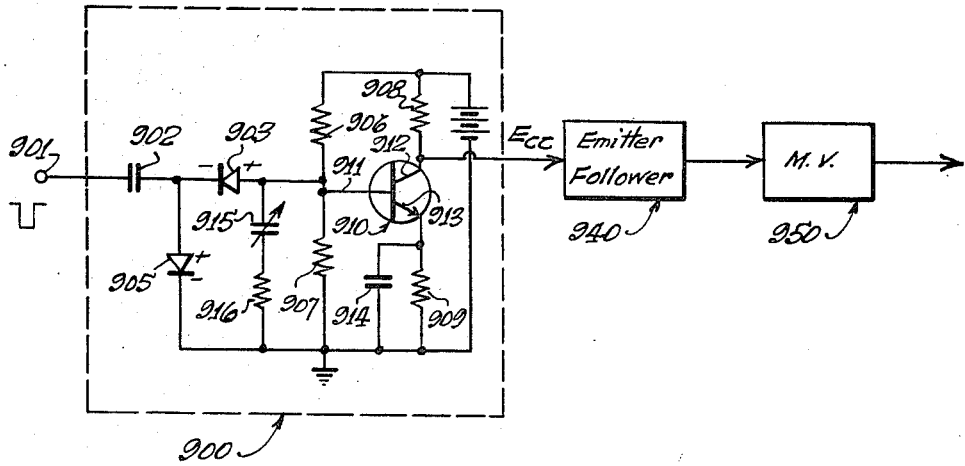
FIGURE 7 is a schematic diagram of pulse-stretching circuitry used in the system of FIGURE 2.

Turning now to FIGURE 7 of the drawing, the pulse width control 9 is shown to consist basically of pulse stretching circuitry within a dashed line enclosure identified by the reference numeral 900, an emitter follower 940 and a multivibrator 950. The pulse stretching circuitry 900 includes a transistor 910 having a base electrode 911, a collector electrode 912, and an emitter electrode 913, the transistor being powered from a source of D.C. operating potential labeled $E_{cc}$. The output from the zero crossover detector is fed to input terminal 901 of the pulse stretching circuitry, the input terminal 901 being coupled to the base electrode 911 by the series combination of a capacitor 902 and a diode 903, diode 903 being polarized as shown with its anode terminal connected to base electrode 911.

Base bias for the transistor 910 is provided by a voltage dividing network consisting of resistors 906 and 907 connected across the voltage source $E_{cc}$, the base electrode 911 being connected to the juncture of these two resistors. Collector bias is provided by a resistor 908 connected between collector electrode 912 and the positive terminal of the voltage source $E_{cc}$. Emitter bias is provided by a resistor 909 connected between the emitter electrode 913 and the negative terminal of the voltage source $E_{cc}$, the resistor 909 being shunted by a bypass capacitor 914. A second diode 905 has its anode terminal connected to the junction between capacitor 902 and diode 903, and its cathode terminal connected to the negative terminal of the voltage source $E_{cc}$. The series combination of a variable capacitor 915 and a resistor 916 is connected between the base electrode 911 and the negative terminal of the voltage source $E_{cc}$.

In order to facilitate explanation of the operation of the circuit, following is a table of typical values utilized in the presently preferred embodiment:

| | | |
|---|---|---|
| $E_{cc}$ | volts | 18 |
| Transistor 910 | | 2N2925 |
| Diodes 903 and 905 | | 1N456a |
| Capacitor 902 | pf | 100 |
| Capacitor 915 | pf | 120–1,200 |
| Capacitor 914 | mf | 1.5 |
| Resistor R16 | k | 20 |
| Resistor 906 | m | 3.6 |
| Resistor 907 | k | 510 |
| Resistor 908 | k | 12 |
| Resistor 909 | k | 1 |

The output of the zero crossover detector is a negative pulse having a pulse width of 40 microseconds, this pulse being applied to the terminal 901. The input capacitor 902 provides the dual function of signal coupling and D.C. blocking, the terminal 901 being typically returned to the positive terminal of the voltage source $E_{cc}$ through a load resistor of the output transistor in the zero crossover detector. Conduction of the zero crossover detector output transistor creates the negative pulse output, which is applied to the terminal 901 to charge capacitor 902 through the diode 905. The ultimate potential value of the stored charge will be that of the incoming pulse minus the drop across diode 905. This pulse will also be coupled by diode 903, this diode then being forward biased by the negative potential on its cathode, to charge the variable capacitor 915 through the resistor 916.

Under no-signal input conditions the potential on base electrode 911 is only slightly above ground, due to the voltage dividing action of resistors 906 and 907. Application of a negative pulse through diode 903 will cut off transistor 910, the capacitor 915 and resistor 916 having a differentiating action to produce an output at the base electrode 911 which is more than 40 microseconds wide at the operating point bias level of transistor 910 under maximum signal strength conditions of received signals. The minimum pulse width is limited by threshold conditions of the zero crossover detector.

Variable capacitor 915 is adjusted so that upon being charged by a zero crossover detector output pulse resulting from reception of a ground wave signal, it will discharge slowly enough so that it will still be partially charged at the time sky wave pulses would subsequently arrive, thereby causing any of these subsequently arriving pulses to be merged into the original pulse.

This operation is somewhat analogous to that of a cascade voltage doubler, operating at the peak-to-peak value of the incoming alternating waveform. Variable capacitor 915 is adjusted so that closely spaced peaks will merge to produce a D.C. output of long time constant, the output being a negative waveform having a sharp leading edge with a slowly decaying trailing edge, thereby maintaining transistor 910 cut off for a longer period of time in the presence of sky wave reception. Thus, the output at the electrode 912 of transistor 910 will be a pulse which varies in width, determined by the number of zero crossings producing pulses at the terminal 901.

All pulses produced in sequences within a 40 to 80 microsecond occurrence at the terminal 901 will be merged into a single pulse at the collector of transistor 910 by the action of this automatic pulse width control circuit (diodes 903 and 905, capacitors 902 and 915, and resistor 916) and the inverter circuit formed by the transistor 910. Thus, if there are no sky waves associated with a received ground wave pulse, the output pulse of the pulse stretching circuitry will be the minimum specified width of 40 microseconds (the pulse width of transmitted loran signals). If sky waves are present they will be differentiated and the pulse stretching circuitry will increase its output pulse width to a value greater than 40 microseconds to thereby effectively blank out the sky wave pulses. The greater the number of sky wave crossovers occurring, the greater the stretching of the output pulse. However, as a practical matter the maximum sky wave reception conditions that could be expected to introduce bothersome errors would result in a pulse width on the order of 250 microseconds, whereas the timing interval of loran signals is on the order of milliseconds. Hence, action of sky waves on the pulse stretching circuitry will not cause blanking out of subsequently received ground wave signals from the same station. The pulse stretching circuit blanks out everything after the first received pulse for a time which is a function of the sky wave reception condition. The width of the output pulse is unimportant, since it is the leading edge of this output pulse which occurs at the desired instant of time and which is used to trigger the multivibrator 950 through the emitter follower 940, the emitter follower 940 functioning as an impedance matching device. Since sky wave pulses closely following ground wave signals are effectively blanked out by the pulse stretching circuitry, they cannot trigger the multivibrator 950.

The 40 microsecond fast rise output pulse from the multivibrator 950 of the radio receiving means A is fed to the discriminating and computing means B, the steep leading edge of this output pulse occurring at the 90° point of the cosine function of the received ground wave pulse. As can be seen from the diagram of FIGURE 1, the output pulse from the radio receiving means A is fed to the main timing generator 20 and the complement timing generator 40. Referring now to FIGURE 2 of the drawing, there is shown a block diagram which is in somewhat more detail than that of FIGURE 1. The main timing generator 20 is shown to consist of the following chief components: a timer gate 21, a main timer 22, a delay extender 23, a loran station discriminator 24, a timer phase control 25, a timer reset 26 and a specific PRR (pulse repetition rate) reset 27.

The complement timing generator 40 is somewhat similar to the main timing generator 20 and is shown to consist of the following main components: a timer gate 41, a complement timer 42, a delay extender 43, a loran station discriminator 44, a combined phase control and timer reset 45, and a specific PRR reset 47.

The hereinabove stated basic functions of the main timing generator 20 to create a marker pulse one-half the loran period after generator actuation and a program gate which is momentarily opened one loran period after generator actuation is accomplished by the basic components shown in the block diagram of FIGURE 2. The output of the radio receiving means A is fed to timer gate 21 which functions to gate clock pulses from the clock 10 into the main timer 22, whenever the gate is opened. The gate is opened for intervals of time slightly less than the loran period (L) of the station tuned in, as will be hereinbelow explained.

Main timer 22 is a counting circuit which produces timing pulses for holdoff generator 15 and delay extender 23. The countdown interval of main timer 22 is slightly less than one-half of the loran period (L/2) of the station tuned to, the countdown interval being selectable by means of a multi-position switch 101, switch 101 also selecting an identical countdown interval for complement timer 42 in the complement timing generator 40. The main timer output to holdoff generator 15 actuates the holdoff generator to prevent triggering of complement timer 42 by the same signal that triggered main timer 22, and for a specified period thereafter during which a signal from the complement loran shore station could not be arriving because of the known delay interval between master and slave stations.

The main timer output to delay extender 23 actuates the delay extender slightly before the L/2 period, the delay extender being a counting circuit which extends the count while the main timer is being reset. The delay extender provides an output pulse at L/2, and slightly before and slightly after L to establish the limits of the program gate. Since the timing accuracy of loran shore stations is currently known to be ±2 microseconds, it is apparent that the width of the program gate should be at least 4 microseconds. Thus, for a 4 microsecond program gate the delay extender would provide a pulse at L minus two microseconds and at L plus two microseconds, these pulses being fed to loran station discriminator 24. Although a program gate width of 4 microseconds theoretically provides maximum accuracy, wider gate widths of up to about eight microseconds could be utilized in the interest of reliability without any appreciable adverse effect upon speed of system operation. In the illustrated embodiment the program gate width is 4 microseconds.

The loran station discriminator 24 is a gating circuit which is opened by the output of the delay extender 23 two microseconds before L and closed at two microseconds after L. The loran station discriminator 24 has a second input which is connected to the input of timer gate 21 so that loran pulses will pass through the discriminator whenever its gate is open. Thus, if another loran pulse is received one loran period after the first received pulse, it passes through the loran station discriminator and causes generation of a pulse selection verification output which is fed into the measuring means C. It is in this manner that the main timing generator 20 selects from the received pulses those occurring at the known pulse repetition rate of the station to which the system is tuned. Another output from the delay extender 23 is applied to timer reset 26, the main function of which is to reset main timer 22 before each L/2, the timer having reached the end of its countdown slightly before each L/2.

Timer phase control 25 is fed by the output of delay extender 23, through timer reset 26, the timer phase control functioning to exactly define the L/2 point by generating a pulse beginning with actuation of main timing generator 20 and ending exactly at L/2, and another complementary pulse beginning at L/2 and ending at L. The timer reset 26 output is also fed to specific PRR reset 27, which resets loran station discriminator 24 and timer gate 21 slightly less than one loran period after main timing generator actuation, in preparation for the next cycle of operation.

Thus, in brief summary, the L program gate is created by timer gate 21 opening in response to the first applied loran pulse to feed clock pulses to main timer 22, which triggers delay extender 23 at the appropriate time, triggering of delay extender 23 starting its count to cause creation of pulses establishing the limits of the program gate, these pulses causing the gate of loran station discriminator 24 to open and close to thereby create the desired program gate. The L/2 pulse is created by triggering of delay extender 23 in the aforementioned manner, the count of delay extender 23 triggering timer phase control 25 (through timer reset 26) exactly at L/2 to thereby create the desired L/2 marker pulse.

The complement timing generator 40 functions in the same general manner as that of the main timing generator 20, timer gate 41 opening in response to the first loran pulse applied from radio receiving means A after the complement timing generator is enabled by the holdoff generator 15 upon completion of the holdoff period. Upon opening of the gate, timer gate 41 functions to gate clock pulses from the clock 10 into the complement timer 42 for a period of time slightly less than one half the loran period L, the complement timer being a counting circuit which produces timing pulses for triggering of delay extender 43. The countdown interval of the complement timer 42 is slightly less than one-half the loran period of the station turned to, these countdown intervals being controlled by switch 101. The complement timer output to delay extender 43 actuates this delay extender slightly before the L/2 period, delay extender 43 being a counting circuit which extends the count while the complement timer is being reset. Delay extender 43, like delay extender 23, provides an output pulse one-half the loran period after actuation of its associated timer, and slightly before and slightly after one loran period. Output of the delay extender 43 is fed to loran station discriminator 44 which is a gating circuit opened and closed by the output of delay extender 43 to create the desired program gate one loran period after actuation of complement timer 42. Thus, if another loran pulse is received one loran period after the pulse which actuated complement timer 42, it will pass through discriminator 44 and cause generation of a pulse selection verification output which is fed into the measuring means C. It is in this manner that the complement timing generator 40 selects from the pulses applied to it those occurring at the known pulse repetition rate of the station to which the system is tuned. Another output from delay extender 43 is applied to phase control and timer reset 45, the main function of which is to reset complement timer 42 one-half loran period after complement timing generator actuation, complement timer 42 having reached the end of its countdown slightly before each loran half period point.

The output of phase control and timer reset 45 is fed to specific PRR reset 47, which resets loran station discriminator 44 and timer gate 41 slightly less than one loran period after complement timing generator actuation, in preparation for the next cycle of operation. Thus, it is seen that the complement timing generator functions in a manner almost identical to that of the main timing generator, with the exception it does not provide an L/2 marker pulse output, thereby enabling simplification of its phase control and the combination of the phase control into the timer reset, as will be hereinbelow explained.

Bearing in mind that the basic operational concept of the present invention device renders it unnecessary to distinguish between master and slave pulses and to selectively lock onto the master pulse, the present invention main timing generator 20 is actuated by the first pulse received and the complement timing generator by the first pulse received after completion of the holdoff period. If the pulse which actuated the main timing generator was from the desired loran shore station, then the next received corresponding pulse from that station will arrive one loran period later and will be applied to the main timing generator not more than 4 microseconds after opening of its program and timer gates. Therefore, this next received pulse will be passed through the program gate and will also again actuate the main timer to initiate another cycle of main timing generator operation.

If, on the other hand, the pulse which first actuates the main timing generator is not from the desired loran station then, in the absence of any extraneous signals arriving one loran period later during the 4 microsecond period the main timing generator program gate is open, the main timing generator will be again actuated by the first subsequently received signal. Thus, it is apparent that the main timing generator will effectively "search" until it determines that it was actuated by a signal from the desired loran shore station, whereupon it "locks on" to that series of synchronized pulses, regardless of whether they are master pulses or slave pulses. The complement timing generator operates in a similar manner, searching for loran shore station pulses and then locking onto that series of synchronized pulses. The main timing generator and complement timing generator cannot lock onto the same series of pulses due to the operation of holdoff generator 15, and in some certain instances complement timing generator lock-on might be achieved before main timing generator lock-on.

Neither the main timing generator nor the complement timing generator will produce a pulse selection verification output to the measuring means C unless that particular generator determines that it is locked onto pulses from the desired loran shore station. The measuring means C will not produce an output to the indicating means D unless information inputs are received from both the main timing generator and the complement timing generator, as will now be explained.

System operation will be described as being performed in two phases of the loran period, the first phase beginning upon actuation of the main timer and ending at L/2, and the second phase extending from L/2 to the end of that loran period. As shown in FIGURE 2, the measuring means C generally comprises a master/slave sequence comparator 31 and a readout start/stop gate 32. Comparator 31 receives three basic inputs from main timing generator 20 and one basic input from complement timing generator 40. The input from the complement timing generator 40 comprises a pulse selection verification output pulse which indicates that a received pulse was coincident with the program gate of discriminator 44. One input from the main timing generator 20 is an L/2 marker pulse output of timer phase control 25. Another input from the main timing generator 20 comprises a complementary level output from timer phase control 25 which enables determination of whether the pulse output from the complement timing generator 40 occurred during phase one or phase two of the main timer operation. The third input from the main timing generator 20 comprises reset pulses from specific PRR reset 27, these pulses occurring only near the end of phase two of main timer operation.

The comparator 31 determines whether the applied output pulse from complement timing generator 40 occurs before or after the L/2 marker pulse, the order of occurrence of these two pulses being dependent upon whether a master or a slave pulse from the loran shore station actuated the main timing generator 20. If the main timing generator is triggered by a master pulse from the loran shore station then the L/2 marker pulse will occur first. However, if the main timing generator is triggered by a slave pulse then the pulse from complement timing generator 40 will occur first. The comparator 31 functions to open gate 32 for that specific interval of time between occurrence of the complement timing generator output pulse and the L/2 marker pulse, whichever occurs first, the comparator 31 acting in conjunction with discriminator 24 of the main timing generator to open and close gate 32 at the appropriate times, gate 32 functioning to gate a burst of pulses from the clock 10 into indicating means D. If it is determined that the main timing generator 20 was triggered by a loran station master pulse the gate 32 will open upon occurrence of the L/2 marker pulse and close upon occurrence of the output pulse of discriminator 44 in the complement timing generator. If, on the other hand, it is determined that the main timing generator was triggered by a loran station slave pulse then gate 32 will open upon occurrence of the output pulse from discriminator 44 of the complement timing generator and close upon occurrence of the L/2 marker pulse.

The indicating means D generally comprises an update shaper 36 and a readout counter-indicator 37. The update shaper 36 functions to update the information fed into the readout counter-indicator 37 each time an input is applied from the measuring means C, the indicator 37 containing suitable counting circuitry and indicating devices to provide a direct numerical readout of the desired positional information.

Turning now to FIGURE 3 of the drawing, there is shown the presently preferred logic circuitry for the computing means B, measuring means C, and indicating means D of FIGURE 2. FIGURE 3 comprises three parts, FIGURES 3a, 3b and 3c, these three parts being basically interconnected as indicated in FIGURE 4.

Figure 5:
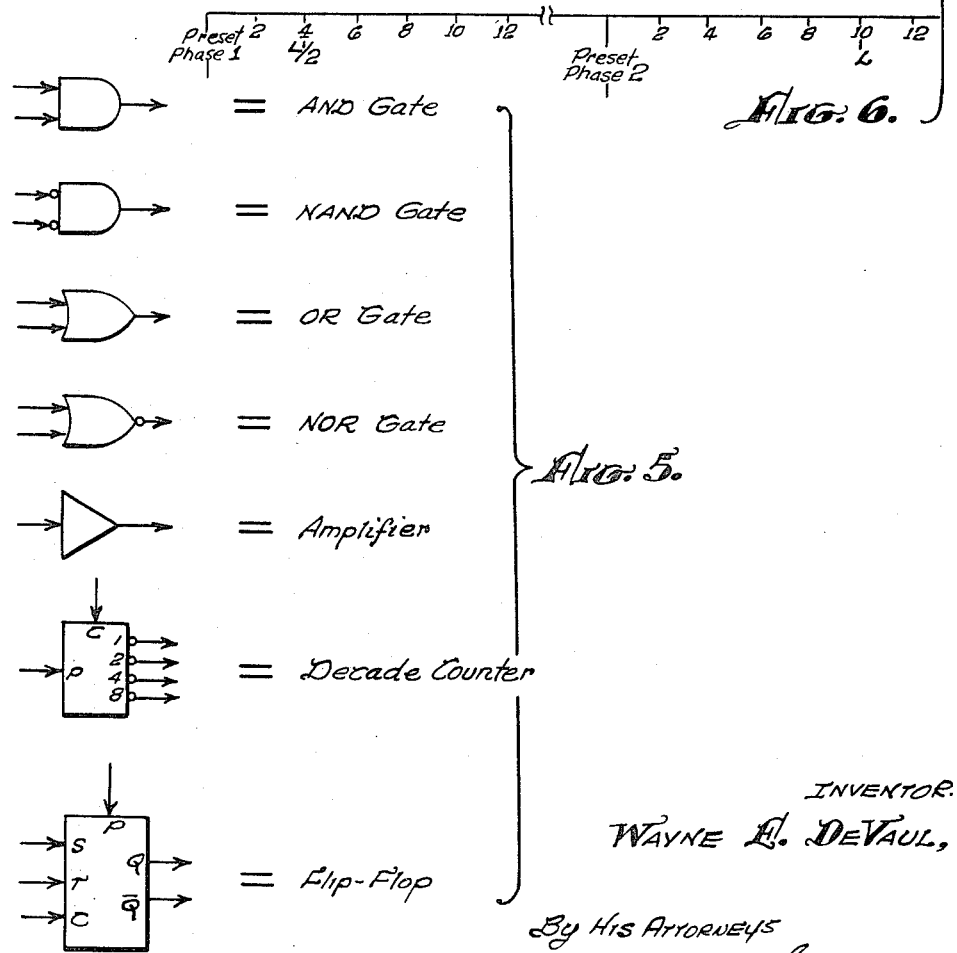
FIGURE 5 is a chart explaining the logic symbols used in the circuits of FIGURES 3a, 3b and 3c.

Turning briefly to FIGURE 5 of the drawing, in this figure there are shown the various logic symbols used in the circuits of FIGURES 3a, 3b and 3c. In general, the use of a small circle or ball at the output terminal of a logic symbol indicates a negative logic. Thus, the symbol for a NOR gate is the base symbol for an OR gate with a ball on its output terminal. A circle or ball on the input terminal of a logic symbol indicates positive logic, and so the symbol for an NAND gate is formed by placing balls on the input terminals of the AND gate symbol.

The flip-flop symbol shown in FIGURE 5 is a 4-input device. The positive input is a preset input (P), the negative input being a toggle input (T). The device has two outputs, an assertion output (Q) and a complement output ($\bar{Q}$), the state of the device being defined by the condition of its Q output. The other two device inputs are a set input (S) and a clear input (C). Of course, not all of the input and output terminals of this basic symbol need be utilized, and hence the logic symbol for simpler types of flip-flops would still be based upon the symbol shown in FIGURE 5 with only the appropriate terminals labeled. This type of flip-flop has the property of changing state each time a high-to-low transition (negative going signal) is applied to its toggle input if both its set and clear input terminals are held low.

The basic symbol for the decade counter is shown as having a reset input (R) and a count input (C), and four outputs labeled with their respective numerical weights in a negative logic system. These four outputs would carry respective weights of 2, 4, 8 and 10 in a positive logic system.

Turning now to FIGURE 3a of the drawing there is shown the circuitry for the main timing generator 20 and holdoff generator 15. The timer gate 21 consists of a flip-flop 164 and a NAND gate 165. Flip-flop 164 is connected so that the first high-to-low transition applied to its toggle input terminal after application of a high level pulse to its preset input will cause it to toggle into the $\bar{Q}$ state and remain there. One of the inputs to NAND gate 165 is connected to the output of the clock 10 and another input is connected to the $\bar{Q}$ output of flip-flop 164, the low level on the $\bar{Q}$ output terminal permitting clock pulses to pass through NAND gate 165. The remaining input to NAND gate 165 is a four microsecond, high level reset pulse from a buffer amplifier 151 in timer reset 26, to inhibit clock pulses during this reset interval. Flip-flop 164 is preset to its Q state near the end of each phase two so that the next incoming high-to-low transition applied to its toggle input from radio receiving means A will toggle it into its $\bar{Q}$ state.

The main timer 22 is a modified preset counter consisting of ripple-carry connected decade counters 111–115 and three levels of gating. Each of the decade counters 111–115 has four outputs carrying numerical weights of 1, 2, 4, and 8, multiplied by the time increment between pulses received on their count input terminal. The multipliers are as follows:

| Decade number: | Time in microseconds |
|---|---|
| 111 | 1 |
| 112 | 10 |
| 113 | 100 |
| 114 | 1,000 |
| 115 | 10,000 |

The first level of gating consists of six 2-input NAND gates 121a, 121b, 122a, 124b, 125a and 125b; one 3-input NAND gate 123; and three inverter amplifiers 122b, 124a and 135b. The 1 and 4 microsecond outputs of decade counter 111 are connected to the inputs of NAND gate 121a, causing the output of this gate to seek a high level for a period of 1 microsecond each time the fifth input clock pulse is applied to the count input terminal of decade counter 111 after the decade counter has been in a zero condition. (A zero condition in each of the decades occurs each time a high level pulse is applied to its reset input terminal and every ten counts thereafter received on its count terminal.) Therefore, the output of NAND gate 121a goes high every 10 microseconds for 1 microsecond, but it goes high only when the fifth clock pulse has been applied to the decade counter 111.

The 8 weight output of decade counter 111 is applied to the count input terminal of decade counter 112. This waveform makes a low-to-high transition when decade counter 111 receives its tenth clock pulse. Therefore, decade 112 receives low-to-high transitions every 10 microseconds. The 40 microsecond output of decade 112 (output terminal 4) is connected to an input of NAND gate 121b whose output is merely an inversion of its input. However, the output of NAND gate 121b is held low whenever a positive operating voltage ($V_{cc}$) is applied at its other input from switch section 101a of switch 101. The output of NAND gate 121b, when inhibited by $V_{cc}$, would represent a zero count rather than a 40 microsecond count.

The 10 and 80 microsecond outputs of decade 112 are connected to the inputs of NAND gate 122a, permitting its output to seek a high level for a period of 10 microseconds after the ninetieth clock pulse has been received by decade 111 (the ninth positive going pulse received by decade 112). This action recurs every 100 microseconds thereafter.

The 8 weight output of decade 112 is connected as the count input to decade 113. The 100 microsecond output of decade 113 is merely inverted by inverter amplifier 122b. The 200 and 400 microsecond outputs are applied to the inputs of NAND gate 123, the output of which goes high for a period of 200 microseconds after receipt of the sixth count pulse by decade 113, and this action recurs every 1,000 microseconds. However, the output of NAND gate 123 may be inhibited by $V_{cc}$ from switch section 101c, in which case the output of NAND gate 123 represents a zero count. The 800 microsecond output is inverted by inverter amplifier 124a. The 8 weight output of decade 113 is connected as the count input of decade 114.

The 1,000 and 8,000 microsecond outputs of decade 114 are connected to NAND gate 124b, the output here going high at the ninth count pulse applied to decade 114 and for every 10,000 microseconds thereafter. Similarly, the output remains high for 1,000 microseconds. Similar action occurs with the 4,000 microsecond output of decade 114 connected to NAND gate 125a, except this output may be inhibited by $V_{cc}$ applied through switch section 102a. The 8 weight output is also connected as the count input to decade 115.

The 10,000 microsecond output of decade 115 is connected to one input of NAND gate 125b which merely inverts the input waveform, but which may be inhibited by $V_{cc}$ through switch section 102b. The 20,000 microsecond output of decade 115 is inverted by inverter amplifier 135b.

The second gating level comprises six NOR gates 131a, 131b, 133a, 133b, 134a and 135a. The output of NAND gate 121a is connected as one input to NOR gate 131a, phase information being applied to the other input of NOR gate 131a to inhibit the output of NAND gate 121a during the second phase of main timer operation for adjustment of preset timing, as will be hereinbelow explained. The output of NOR gate 131a seeks a low level when either of its inputs are high. The output of NOR gate 131a is low during phase two until the end of the 4 microsecond long specific PRR reset pulse, and every time NAND gate 121a output is high during phase one. NOR gate 131a selects either a zero count or a 5 microsecond count depending on the level of the Q output of flip-flop 161.

The inputs of NOR gate 131b are connected to the output of NAND gates 121b and 122a which represent either 40 microseconds or zero and 90 microseconds, depending upon the position of the switch 101. If the output of NAND gate 121b is high at 40 microseconds, then the output of NOR gate 131b will be low at 40 and 90 microseconds, but since 40 microseconds occurs first the 90 microsecond count will not occur in the final NAND operation. However, if the output of NAND gate 121b represents a zero count, then only the 90 microsecond information will appear at the output of NOR gate 131b as a low level.

NOR gate 133a similarly sheets the 100 microsecond output of decade 113 or a zero count depending upon the position of the switch 101. NOR gate 133b selects either a 600 or 800 microsecond count from NAND gate 123 and inverter amplifier 124a.

NOR gate 134a seeks a low level for the 4,000 and 9,000 microsecond counts from NAND gates 124b and 125a, or seeks a low level when the output of NAND gate 125a represents a zero count. NOR gate 135a selects either a 10,000 microsecond interval from NAND gate 125b, or a 20,000 microsecond interval from inverter amplifier 135b.

The third gating level consists of a 6-input NAND gate 132, the inputs being divided into three pairs, respectively indicated as 132a, 132b and 134b. When all inputs from the six NOR gates are low (four microseconds before L/2 in phase one and approximately 10 microseconds before L in phase two), the output of NAND gate 132 will seek a high level to provide a preset pulse to initiate action of the delay extender 23.

As explained hereinabove, delay extender 23 provides a means for continuation of the count while main timer 22 is reset and started once again. The delay extender is a modified and gated ripple-carry binary counter comprising flip-flops 142–145 and a NAND gate 154a. The flip-flops 142, 143 and 144 are preset to the Q condition (Q terminal low) by the half microsecond duration high level pulse from NAND gate 132 in the main timer 22. All the Q outputs are low, and all the $\overline{Q}$ outputs are high except for that of flip-flop 145. The $\overline{Q}$ output of flip-flop 145 is low because toggle action ceased with the last clock pulse after its set input went high as a result of the action of NAND gate 154a. NAND gate 154a produces a low level output as a result of a high level output from the $\overline{Q}$ terminal of flip-flop 143 during the time interval beginning with the leading edge of the preset pulse from NAND gate 132 and ending 4 microseconds later (this pulse being used in both phase one and phase two), and for another 4 microsecond interval beginning 8 microseconds after the leading edge of the preset pulse from NAND gate 132 (this pulse being used only in phase two). The other input to NAND gate 154a is from the $\overline{Q}$ output terminal of flip-flop 142, this output being high for an 8 microsecond interval beginning with the leading edge of the reset pulse. This low level output of NAND gate 154a is 12 microseconds in duration. At the end of this time, both of its inputs are low and the NAND function produces a high input to the set terminal of flip-flop 145, which then toggles to its $\overline{Q}$ state. Further counting by the delay extender is inhibted until another preset pulse occurs.

Figure 6:
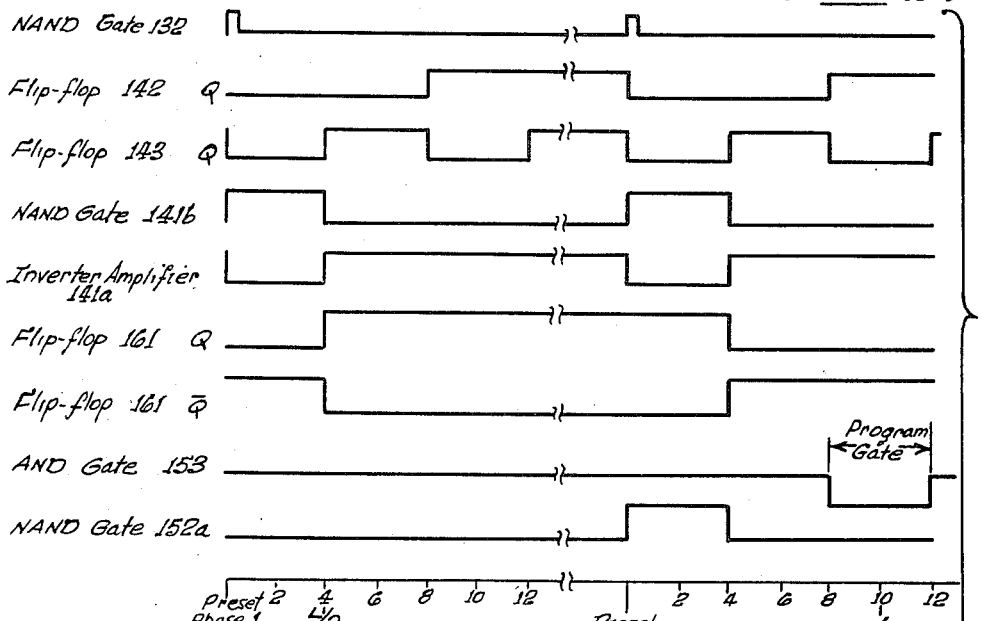
FIGURE 6 is a graph depicting various pulse relationships plotted as a function of time.

The delay extender produces two outputs, these being from the Q terminal of flip-flop 143 and the Q terminal of flip-flop 142. The Q terminal output of flip-flop 143 is connected to one input of an AND gate 153 in discriminator 24, and to an input of a NAND gate 141b in timer reset 26. The Q terminal of flip-flop 142 is connected to the other input of NAND gate 141b. The Q output of flip-flop 143 is low from preset to 4 microsecodns thereafter and low from 8 until 12 microseconds after preset. The Q output of flip-flop 142 is low from preset until 8 microseconds thereafter. These output pulses from the delay extender are combined in various ways to initiate the L/2 marker pulse and L program gate, as will now be explained with reference to FIGURE 6 which shows the various logic outputs plotted as a function of time for the 12 microsecond delay extender countdown intervals in phase one and phase two.

Timer reset 26 is chiefly comprised of the aforementioned NAND gate 141b, together with inverter amplifiers 141a and 151. The timer reset functions to provide pulses 4 microseconds in duration, the pulses being of complementary levels. As explained hereinabove with respect to description of the circuitry of delay extender 23, both inputs to NAND gate 141b are low for the 4 microsecond period beginning at preset; hence NAND gate 141b produces a high level output pulse for this interval. A capacitor 114 is provided to load the circuit to eliminate undesirable short term transients. The output of NAND gate 141b is applied to one input of AND gate 153 in the discriminator 24, and also to the inverter amplifier 141a. The output of inverter amplifier 141a is applied to inverter amplifier 151 to provide another inversion and further power amplification, and also to one input of a NAND gate 152a in the specific PRR reset 27. The output of inverter amplifier 151 is applied to the main timer decade counter reset inputs to reset them to a zero condition 4 microseconds before L/2 in order that counting may be restarted at L/2 and also to reset the counters before L in order that counting may again be started to initiate the next loran period. The output of inverter amplifier 151 is also fed to one input of NAND gate 165 in the timer gate 21 to inhibit clock pulses during the aforementioned reset intervals. The output of inverter amplifier 151 is also applied to the toggle input of a flip-flop 161 in the timer phase control 25.

The timer phase control 25 comprises the flip-flop 161, together with a pair of inverter amplifiers 171a and 171b. The high-to-low excursion of an input pulse to the toggle terminal of flip-flop 161 will cause the flip-flop to change state. In its Q state, the Q output of flip-flop 161 is low and its $\overline{Q}$ output is high. Since the 4 microsecond, high level optput pulse from NAND gate 141b is applied to the toggle input of flip-flop 161 through the inverter implifiers 141a and 151, the Q terminal of flip-flop 161 makes a low-to-high transition exactly at L/2, and a high-to-low transition near the end of phase two. The converse is true for the $\overline{Q}$ terminal output of flip-flop 161. The Q output of flip-flop 161 is connected to one input of the NOR gate 131a to inhibit the output of NOR gate 131a during phase two as hereinabove described.

The Q output of flip-flop 161 is also connected as one input to AND gate 153 in discriminator 24 which creates the program gate. In addition, the Q output of flip-flop 161 is applied to inverter amplifier 171a, the output of inverter amplifier 171a being a low level pulse having its leading edge occurring 4 miscroseconds after delay extender preset in phase one. The $\bar{Q}$ output of flip-flop 161 is applied to inverter amplifier 171b, the output of inverter amplifier 171b being a high level pulse having its leading edge occurring 4 microseconds after delay extender preset in phase one. Thus, the timer phase control produces, through inverter amplifiers 171a and 171b, complementary high and low levels, this being necessary for proper operation of measuring means C, as will be hereinbelow explained. The $\bar{Q}$ output of flip-flop 161 is also connected as one input to NAND gate 152a to create a specific PRR reset pulse at the output of NAND gate 152a. The output of inverter amplifier 171a is connected to the set input of a flip-flop 334 in the holdoff generator 15, and to the clear input of a flip-flop 311 in comparator 31. The output of inverter amplifier 171b is connected to the clear input of a flip-flop 313 in comparator 31, to one input of a NAND gate 325 and the clear input of a flip-flop 334 in holdoff generator 15, and to the input of a one-shot multivibrator 312 in comparator 31.

The specific PRR reset 27 produces a high level output pulse near the end of phase two to reset the following flip-flops: flip-flop 164 in timer gate 21, flip-flops 311, 313, 323 and 332 in comparator 31, and flip-flop 162 in discriminator 24. In addition, the high level output pulse of the specific PRR reset 27 decade counters 411–414 in readout counter-indicator 37, in preparation for the next operating cycle.

The specific PRR reset 27 comprises the NAND gate 152a, followed by inverter amplifiers 152b and 335. The output of inverter amplifier 141a in timer reset 26 is a low level pulse of 4 microsecond duration, this pulse being applied as one input to NAND gate 152a. The $\bar{Q}$ output of flip-flop 161 in timer phase control 25 is low during phase two of the loran station cycle, and is applied as the other input to NAND gate 152a. For 4 microseconds after delay extender preset in phase two, both inputs to NAND gate 152a are low, and this NAND gate will produce an output which is a high level pulse 4 microseconds in duration. The inverter amplifiers 152b and 335 provide the necessary inversion and driving power to reset the various flip-flops and counters mentioned hereinabove.

The loran station discriminator 24 creates the 4 microsecond wide program gate, the program gate being "time centered" on the L time (exactly one loran period after actuation of the main timer 22). The discriminator 44 comprises AND gate 153 and the flip-flop 162. Loran signals from the receiving means A are applied as the toggle input to the flip-flop 162 and if an input is applied to the toggle terminal coincident with the program gate then the signal will trigger the flip-flop to produce an output which is a high-to-low excursion on its $\bar{Q}$ terminal.

AND gate 153 has three inputs, one input being connected to the Q output of flip-flop 143, another input being the 4 microsecond high level output pulse from NAND gate 141b, and the third input being the Q output of flip-flop 161. During phase one of the loran cycle the Q output of flip-flop 161 is low. At no time during the 12 microsecond period of the delay extender counter during phase one will all three inputs to AND gate 153 be low, since the Q output of flip-flop 161 makes a low-to-high transition at the end of the first 4 microseconds of the Q output pulse of flip-flop 143 in the delay extender. The Q output of flip-flop 161 remains in this condition until the delay extender is again allowed to count. Just before the end of phase two AND gate 153 produces a low level output. At the end of the first 4 microseconds of the count of the delay extender during phase two the Q output of flip-flop 161 seeks a low level due to the Q output of flip-flop 143 in the delay extender. Four microseconds later (a total of 8 microseconds since the delay extender count began) the Q output of flip-flop 143 in the delay extender again makes a high-to-low transition, the output of NAND gate 141b also being low at this time. For the last 4 microseconds of the 12 microsecond delay extender count then, all inputs to AND gate 153 are low, thereby producing a 4 microsecond program gate pulse on the clear input of flip-flop 162. A negative going loran trigger on the toggle input will cause the $\bar{Q}$ terminal of flip-flop 162 to make a high-to-low transition. The flip-flop 162 has its Q terminal connected to its own set input terminal to make it lock up after being triggered until a positive pulse on its preset input causes the Q terminal to again seek a low level. A high level on the set input of flip-flop 162 assures that the $\bar{Q}$ terminal will remain high until a trigger on the toggle input occurs coincident with the program gate (the 4 microsecond low input on the clear input terminal of flip-flop 162). For 4 microseconds the set and clear inputs of flip-flop 162 are both low, and a negative transition on the toggle input will cause flip-flop 162 to change state, thereby indicating lock-on. The $\bar{Q}$ output of flip-flop 162 (the pulse selection verification output) is connected to one input of a NAND gate 333 in the readout start/stop gate 32 to permit counting when properly triggered.

In summary, the preset pulse from NAND gate 132 occurs in phase one 4 microseconds before L/2, timer reset NAND gate 141b producing a 4 microsecond high level pulse beginning with preset and ending at L/2, the leading edge of the NAND gate 141b output pulse causing preset of main timer decade counters (through output of inverter amplifier 151), the trailing edge of this pulse causing generation of the L/2 marker pulse by toggling phase control flip-flop 161. In phase two, a specific PRR reset pulse is generated at preset by opening of NAND gate 152a, and a 4 microsecond program gate is opened 8 microseconds after preset by opening of discriminator NAND gate 153 and action of flip-flop 162. Thus, it is apparent that preset in phase two should occur approximately 10 microseconds before L in order to time center the program gate on L, thereby giving rise to a difference of 5 microseconds between occurrence of the phase control output in phase one and phase two. To accomplish this result the main timer output in the form of a preset pulse to the delay extender is generated 5 microseconds sooner in phase two by inhibiting the output of NAND gate 121a to shorten the main timer count in phase two by 5 counts. More functions during the delay extender at the end of phase two are employed in order that the entire system reset conditions may be established and time be made available for widening of the program gate if desired, the 4 microsecond preset time interval in phase one being sufficient to allow for adequate reset time. Present design of the preset counter allows approximately 1.2 microseconds of propagation time through the decade counters and associated NAND and NOR gates during each countdown cycle.

The holdoff generator 15 produces an output waveform depending upon the basic repetition rate of the loran shore stations of each of the H, L and S bands. The holdoff generator 15 comprises NAND gates 315b, 314b and 325, and inverter amplifier 315a, a 3-input NOR gate 324 and a flip-flop 334. The purpose of delay generator 15 is to provide an inhibit signal to the complement timer gate 41 to prevent actuation of the complement timer by the same signal which actuated the main timer and for a selected delay interval thereafter during which the complement loran signal could not arrive. The output waveform of the holdoff generator is high during the desired delay interval, and is low for the interval during which the complement loran signal could be received. Although the maximum delay interval of a loran line is less than 10 milliseconds, most stations have a long base line extension between 3,000 and 7,000 microseconds. Therefore, it is presently preferred that the holdoff generator waveform goes to a low level 10 milliseconds before the L/2 marker of the main timing generator, and remains there until 10 milliseconds after the L/2 marker for H and L band stations, remaining low for 15 milliseconds after L/2 for S band stations. Although the S band station holdoff waveform could be for an identical interval as for the H and L band stations, it would require more gating circuitry and components, without significantly improving system performance. The holdoff interval in the illustrated device is selected by switch 102.

The NAND gate 315b inputs are connected to the 1,000 microsecond and 4,000 microsecond weight outputs of decade counter 114 so that the output of the NAND gate 315b goes high 5 milliseconds after reset and every 10 miliseconds thereafter. The output signal of NAND gate 315b is inverted by inverter amplifier 315a and applied as one input to NAND gates 314b and 325. The other input of NAND gate 314b is connected to the 10,000 microsecond weight output of decade counter 115, causing the output of NAND gate 314b to seek a high level 15,000 microseconds after reset of the decade counters. This signal is used to trigger flip-flop 334 through NOR gate 324 when the holdoff generator waveform should go low at the instant 15 milliseconds has elapsed in phase one of the main timer, this being the holdoff interval for S band stations. The phase two trigger for S band stations comes from the 15 millisecond output of NAND gate 314b. The inverted 10,000 microsecond output of decade counter 115 is also applied as an input to NOR gate 324, this waveform being inhibited for S band stations by the application of $V_{cc}$ to NAND gate 125b through switch section 102b. This inverted 10,000 microsecond pulse triggers flip-flop 334 into its $\bar{Q}$ state for phase one for L band stations, and also triggers flip-flop 334 into its Q state in phase two for H and L band stations so that the holdoff generator waveform seeks a high level to reinitiate holdoff action.

The 5 millisecond output of inverter amplifier 43 is applied to an input of NAND gate 325, the phase control waveform from inverter amplifier 38 in phase control 25 being applied as another input, this waveform being low during phase one and high during phase two. This action inhibits the output of NAND gate 325 during phase two to prevent a 5 millisecond trigger from occurring which would cause premature triggering of flip-flop 334. The voltage $V_{cc}$ through switch sections 102a and 102b is also applied as an input to NAND gate 325 to inhibit the output for L and S band stations. Since the 5 millisecond pulse from NAND gate 325 occurs first for H band stations, this output will trigger flip-flop 334 to cause the holdoff waveform to seek a low level. The set and clear inputs of flip-flop 334 are fed from the outputs of the respective inverter amplifiers 171a and 171b to provide complement phase control information.

Turning now to FIGURE 3b of the drawing, it is seen that the circuitry for the complement timing generator 40 is substantially identical to that of main timing generator 20, except for simplification of the timer phase control and specific PRR reset circuits. The last two digits of each of the reference numerals of the various logic components in the complement timing generator are identical with their corresponding counterparts in the main timing generator. For example, the complement timer gate 41 comprises a flip-flop 264 and a NAND gate 265 corresponding respectively to flip-flop 164 and NAND gate 165 in the main timer gate 21. The operation of the two circuits is somewhat similar, noting that the $\bar{Q}$ output of flip-flop 334 in holdoff generator 15 is applied to the clear input of flip-flop 264 of the complement timer gate 41. Flip-flop 264 is connected so that the first trigger on its toggle terminal after application of a high level pulse to its preset input will cause it to toggle into the $\bar{Q}$ state and remain there, providing its clear input terminal is low. Since the $\bar{Q}$ output of flip-flop 334 in holdoff generator 15 is high during the holdoff interval the complement timer cannot be triggered during the holdoff interval.

The low level on the $\bar{Q}$ output of flip-flop 264 in the complement timer gate permits clock pulses to pass through NAND gate 265. Another input to NAND gate 265 is the 4 microsecond reset pulse from buffer amplifier 251 to inhibit clock pulses during this interval, the third input to NAND gate 265 being the clock pulse output. Flip-flop 264 is reset at the end of each complete countdown of the complement timer so that the next incoming trigger pulse will toggle this flip-flop and initiate the next cycle of complement timing generator operation.

Since the output of complement specific PRR reset 47 is used only to reset flip-flops in the timer gate and discriminator of the complement timing generator (the specific PRR reset performing these functions in the main timer as well as resetting various flip-flops and counters in the measuring means C and indicating means D) it is unnecessary to amplify the output of NAND gate 252a. Also since the complement timing generator does not provide L/2 outputs to the measuring means C and the holdoff generator 15, inverting amplifiers on the Q and $\bar{Q}$ outputs of flip-flop 261 in the phase control and timer reset 45 are unnecessary.

Turning now to FIGURE 3c of the drawing the master/slave sequence comparator 31 of measuring means C is seen to be comprised of flip-flops 311, 313, 323 and 332, a one-shot multivibrator 312, and a pair of NOR gates 322a and 322b. The purpose of comparator 31 is to provide triggers at the L/2 interval of the main timing generator and at the occurrence of an output pulse from the complement timing generator. The order of occurrence of these two pulses is dependent upon which of the loran shore station pair triggered the main timing generator. These pulses are used to start and stop the gating of clock pulses to the readout counter-indicator 37, depending on their sequence of occurrence. If the main timing generator is actuated by a pulse from the master loran shore station then the L/2 marker pulse will occur first. If the main timing generator is actuated by a slave station pulse then the pulse from the complement timing generator will occur first. The comparator 31 provides these triggers and pulses in the proper order of occurrence to the appropriate input terminals of the readout start/stop gate 32.

Inputs to comparator 31 are from the following sources: (1) the ouput of inverter amplifier 171b which is low in phase one and high in phase two; (2) the output of inverter amplifier 171a which is high in phase one and low in phase two; (3) the ouput of flip-flop 262 in discriminator 44 of the complement timing generator, this output going from a high to a low condition only when the complement timer is triggered by pulses from the desired shore station pair; and, (4) a high level reset pulse from inverter amplifier 335 of the main timing generator specific PRR reset 27, this reset pulse occurring near the end of the main timer countdown cycle.

If the main timer is triggered by a pulse from the loran master station, the first input to the sequence comparator 31 is the complementary output levels of inverter amplifiers 171a and 171b. The low-to-high transition of the output of inverter amplifier 171b is shaped by the one-shot multivibrator 312 into a short duration (approximately one-half microsecond) high level pulse which is applied to one input of both NOR gates 322a and 322b. Both of these NOR gates produce outputs which are low level pulses having their leading edges occurring at L/2. The output of NOR gate 322b is connected to the toggle input of flip-flop 323.

Flip-flop 323 has its clear input returned to a low level (minus $V_{cc}$) and has been set to its Q condition by the specific PRR pulse. Upon receiving the high-to-low level transition at L/2 on its toggle terminal, the $\bar{Q}$ output of flip-flop 323 seeks a low level and this low level output is provided as one input to the readout start/stop gate 32 and the clear input of flip-flop 332.

The pulse selection verification output from discriminator 44 of the complement timing generator is applied to the toggle inputs of flip-flops 311 and 313. Only one of these two flip-flops will respond since complementary levels are applied to their clear inputs during phase one and phase two. Under conditions of master station triggering of the main timer and slave station triggering of the complement timer, flip-flop 311 will respond to the high-to-low level transition on its trigger input since both its set and clear inputs are low during phase two of main timer operation. The Q output of flip-flop 311 will seek a high level, and the resulting low-to-high transition is applied as one input to NOR gate 322a. The other input to NOR gate 322a is low at this time due to the quiescent condition of the one-shot multivibrator 312. The output of NOR gate 322a is a high-to-low transition which is provided as an input to the toggle terminal of flip-flop 332.

Flip-flop 332 has its clear input held low by the ouput of flip-flop 323 and has been preset to its Q condition by the specific PRR pulse. The Q outputs of both flip-flop 323 and 332 are returned to their set inputs and cause them to lock up on their $\bar{Q}$ states from time of toggle until preset by the specific PRR pulse. Flip-flop 332 is then ready to be toggled to its $\bar{Q}$ state by the high-to-low level transition from NOR gate 322a, at which time the Q output of flip-flop 332 seeks a high level, this high level output being applied as one input to the readout start/stop gate 32.

In the case where the main timer is triggered by a pulse from the loran slave station, then the complement timer will be actuated during phase one of the main timer. The negative transition of flip-flop 262 in the complement timing generator 44 will cause flip-flop 313 to change state at that time since both its set and clear inputs are low during phase one. The low-to-high transition appearing at the Q terminal of flip-flop 313 will cause the output of NOR gate 322b to make a high-to-low level transition and remain there for the remainder of phase one. The output of NOR gate 322b has the same function on the input of flip-flop 323 as described hereinabove with respect to the case of main timer triggering by a master station pulse.

When the end of phase one of the main timer has produced the change in the output levels of inverter amplifiers 171a and 171b, the hereinabove described action of one-shot multivibrator 312 is repeated. The generation of the L/2 marker pulse then occurs by way of NOR gate 322a. Since the two inputs of NOR gate 322b are high at the time of the generation of this marker, they produce no change in the gate output level. Because flip-flop 311 has remained in its Q state, its Q terminal output holds one input to NOR gate 322a low. The low-to-high level pulse output of one-shot multivibrator 312 produces a high-to-low level transition via NOR gate 322a on the toggle input of flip-flop 332. The condition of flip-flop 332 has been hereinabove described and its Q terminal output at this time is a low-to-high level transition which is provided as an input to NAND gate 333 comprising the readout start/stop gate 32.

The function of flip-flop 323 in the comparator 31 is to initiate the gating interval during which clock pulses pass through NAND gate 333 into the readout counter-indicator 37, and the function of the flip-flop 332 is to end this gating interval.

The additional inputs to NAND gate 333 are 1 MHz clock pulses from clock 10 and main timing generator pulse selection verification output pulses from discriminator 24 (the $\bar{Q}$ output of flip-flop 162). It is apparent that in order for clock pulses to pass through NAND gate 333 there must be applied simultaneously a low level $\bar{Q}$ output from flip-flop 162 of discriminator 24, a low level $\bar{Q}$ output from flip-flop 323, and a low level Q output from flip-flop 332.

The update shaper 36 comprises a one-shot multivibrator 321 and an inverter amplifier 331. The Q output of flip-flop 332 is fed to the one-shot 321 as is the $\bar{Q}$ output of flip-flop 334 of the main timing generator, the low-to-high transition of flip-flop 332 being reshaped by the update shaper to update storage devices in the readout counter-indicator. The Q output of flip-flop 334 then provides the update command signal, and it is apparent that both flip-flops 332 and 323 must be triggered before an update command can be generated. The input to the one-shot multivibrator 321 from the holdoff generator flip-flop 334 is a high level inhibiting pulse which prevents occurrence of an update command signal during normal resetting of the multivibrator 332. The one-shot 321 can be a NAND gate connected as one-shot multivibrator which responds to low-to-high transition on its trigger input terminal. The high level output pulse of one-shot 321 is inverted and amplified by inverter amplifier 331 to provide the necessary current and proper polarity to update the storage elements in the readout counter-indicator.

The readout counter-indicator 37 comprises four decade counters 411-414, four buffer/memory or storage units 421-424, four decoder/driver units 413, and four Nixie tube indicators 441-444.

The decade counters 411-414 are connected as ripple-carry decade counters. The count input of decade 411 is connected to the output of NAND gate 333 from which gated clock pulses are applied for periods of time related to the loran line of position. The 8 weight output of decade counter 411 is connected to the count input of decade 412, the 8 weight output of decade 412 being connected to the count input of decade 413, and the 8 weight output of decade 413 being connected to the count input of decade 414. The BCD inputs of storage units 421-424 are connected to the corresponding BCD outputs of respective decade counters 411-414. The BCD outputs of the storage units are connected to the corresponding BCD inputs of associated decoder/driver units 431-434. The decimal outputs of the decoder/drivers are connected to corresponding decimal inputs of the respective Nixie indicators 441-444.

The anodes of all the Nixie indicators 441-444 are connected to the positive terminal of a high voltage supply through suitable load resistors, not shown. Since the clock frequency in the illustrated embodiment is 1 MHz a clock pulse occurs every microsecond and hence readout will be directly in microseconds, Nixie indicators 441-444 presenting a microsecond readout corresponding to the last four digits of the loran line of position as it appears on a loran chart. A readout of the entire loran line, such as 2H2-2446, for example, can be easily provided by the addition of three extra Nixie indicators. The first Nixie indicator would be operated through a four position switch having its movable arm grounded and its various positions connected to the Nixie cathode numbers 1-4. The second Nixie indicator would be provided with three cathodes, the cathodes being in the form of the letters H, L and S, this indicator being operated from the switch 102. The cathodes of the third extra Nixie indicator would be connected to the various terminals of the switch 101. Thus, the three extra Nixie indicators would provide the first three characters of the loran line. In addition, provision may be easily made for remote indicators.

Prior art loran systems operate by selectively locking onto the master pulse, a readout being obtained which indicates the number of microseconds between L/2 and occurrence of the slave pulse. In the present invention system, on the other hand, it is unnecessary to selectively lock onto the master pulse. If the present invention system happens to lock onto a master pulse readout will be the same as in a prior art system, i.e., the number of microseconds between L/2 and the slave pulse. But if the present invention system should happen to lock onto a slave pulse then the master pulse will occur during phase one of main timer operation (before L/2) and the readout obtained will be the number of microseconds between occurrence of the master pulse and L/2 (of the slave cycle). It can be shown that in the master station cycle the interval between L/2 and the slave pulse is identical to the interval between the master pulse and L/2 in the slave cycle. Thus, the present invention system will provide a direct readout of the last four digits of the loran line regardless of whether the system locks onto a master pulse or a slave pulse.

In fabrication of the present invention system it has been found particularly suitable to use integrated circuit components, I–C storage, decade counter and decoder/ driver units being readily commercially available as well as flip-flops, gates, etc. The use of integrated circuit components in the fabrication of the present invention device enables a significant reduction in size and weight, the presently preferred embodiment (exclusive of power supply) requiring less volume than a shoe box.

Although the present invention has been described with a certain degree of particularity, it is understood that the present disclosure has been made only by way of example and that numerous changes in the combination and arrangement of parts may be resorted to without departing from the spirit and scope of the invention as hereinafter claimed.

What is claimed is:

1. In apparatus for navigational aid systems of the kind wherein positional information is conveyed by successively recurring groups of signal pulses transmitted on a predetermined frequency at a predetermined pulse repetition rate, the time relationship between pulses of group representing a locus in which an object is positioned:
   (a) radio receiving means for receiving and detecting pulses on said predetermined frequency;
   (b) discriminating and computing means coupled to said radio receiving means for selecting from the detected pulses those pulses recurring at said predetermined pulse repetition rate, and for establishing a marker pulse one half the pulse group period after any one of said selected pulses; and
   (c) measuring means coupled to said discriminating and computing means for measuring the time interval between said marker pulse and the selected pulse next succeeding the pulse to which said marker pulse is referenced, regardless of whether or not said marker pulse is established before or after said selected pulse next succeeding the pulse to which said marker is referenced.

2. In apparatus for navigational aid systems of the kind wherein positional information is conveyed by successively recurring groups of signal pulses transmitted on a predetermined frequency at a predetermined pulse repetition rate, the time relationship between pulses of group representing a locus in which an object is positioned comprising:
   (a) radio receiving means for receiving and detecting pulses on said predetermined frequency;
   (b) discriminating and computing means coupled to said radio receiving means for selecting from the detected pulses those pulses recurring at said predetermined pulse repetition rate, and for establishing a marker pulse one half the pulse group period after any one of said selected pulses;
   (c) measuring means coupled to said discriminating and computing means for measuring the time interval between said marker pulse and the selected pulse next succeeding the pulse to which said marker pulse is referenced, regardless of whether or not said marker pulse is established before or after said selected pulse next succeeding the pulse to which said marker pulse is referenced; and
   (d) indicating means coupled to said measuring means for correlating the measured time interval to said locus and presenting an information output indicative of said locus.

3. Apparatus as defined in claim 2, wherein said discriminating and computing means comprises a main timing generator having its input coupled to the output of said radio receiving means and having its output coupled to said measuring means, a complement timing generator having its input coupled to the output of said radio receiving means and having its output coupled to said measuring means, clock means having its output coupled to said main timing generator and to said complement timing generator, and a holdoff generator having its input coupled to said main timing generator and its output coupled to said complement timing generator, said main timing generator being actuable by the output of said radio receiving means for generating a marker pulse output to said measuring means one half the pulse group period after actuation and a program gate which momentarily opens one pulse group period after actuation to pass therethrough any then occurring output pulses from said radio receiving means to generate a main timing generator pulse selection verification output to said measuring means, said complement timing generator being actuable by the output of said radio receiving means for creating a program gate which momentarily opens one pulse group period after actuation to pass therethrough any then occurring output pulses from said radio receiving means to generate a complement timing generator pulse selection verification output to said measuring means, said holdoff generator being actuable by said main timing generator to prevent actuation of both the main and complement timing generators by the same output pulses from said radio receiving means and to prevent actuation of said complement timing generator until a predetermined time interval after actuation of said main timing generator, each of said main and complement timing generators including circuitry for counting pulses from said clock means to establish various time intervals.

4. Apparatus as defined in claim 3, wherein said measuring means comprises sequence comparator means having its input coupled to the mark pulse output of said main timing generator and to the complement timing generator pulse selection verification output, and readout gating means having multiple inputs coupled to the output of said sequence comparator means, to said clock and to the main timing generator pulse selection verification output, said sequence comparator means being actuable by the marker pulse output of said main timing generator and the complement timing generator pulse selection verification output to determine whether the output pulse from said complement timing generator occurs before or after said marker pulse and to generate a single pulse output to said readout gating means for that specific interval of time between occurrence of the complement timing generator pulse selection verification output pulse and the marker pulse, whichever occurs first, said readout gating means being actuated only upon concurrence of the output of said sequence comparator means with the main timing generator pulse selection verification output to thereupon gate clock pulses into said indicating means for said specific interval of time.

5. Apparatus as defined in claim 4, wherein each of said main timing generator and said complement timing generator further include specific PRR reset means for producing a reset pulse slightly less than one pulse group period after generator actuation, and wherein said indicating means comprises updating means and counting and indicating means, said updating means being coupled to the output of said readout gating means and to the output of said holdoff generator, said counting and indicating means being coupled to the output of said updating means, to the output of said readout gating means and to the output of the PRR reset means in said main timing generator, the reset pulse output of the PRR reset means in said main timing generator resetting said sequence "comparator" means, said readout gating means and the counting circuitry in said main timing generator and said counting and indicating means, the reset pulse output of the PPR reset means in said complement timing generator resetting the counting circuitry in said complement timing generator, said updating means being actuable by the output of said readout gating means to provide an output each time an input is applied from said measuring means, said counting and indicating means being actuable by the output of said readout gating means to count the clock pulses and to store the count until updated by an output from said updating means and to present a visual readout indicative of the clock pulses counted.

6. Apparatus as defined in claim 3, wherein each of said main and complementary timing generators includes circuitry for rendering that generator insensitive to the output of said radio receiving means for a predetermined time less than one pulse group period after actuation.

7. Apparatus as defined in claim 2, wherein said radio receiving means includes a polarized zero crossover detector which produces an output pulse having its leading edge at the 90° point of the cosine function of a received pulse, pulse width control means coupled to the output of said zero crossover detector for producing an output pulse the width of which is a function of the number of output pulses from said zero crossover detector within a predetermined time interval and pulse generating means triggered by the leading edge of the output pulses from said pulse width control means to produce output pulses of a constant predetermined width, whereby detected sky wave pulses closely following ground wave signals can be effectively blanked out by said pulse width control means to prevent sky wave actuation of said pulse generating means.

References Cited

UNITED STATES PATENTS

| 2,689,347 | 9/1954 | Lawrance | 343—103 |
| 2,794,979 | 6/1957 | Palmer | 343—103 |

RODNEY D. BENNETT, *Primary Examiner.*

H. C. WAMSLEY, *Assistant Examiner.*